(12) United States Patent
Gannameneni (10) Patent No.: US 11,949,330 B2
(45) Date of Patent: Apr. 2, 2024

(54) INTEGRATED POWER CONVERSION TOPOLOGY FOR ELECTRIC VEHICLES

(71) Applicant: Volvo Car Corporation, Gothenburg (SE)

(72) Inventor: Narendar Rao Gannamaneni, Gothenburg (SE)

(73) Assignee: VOLVO CAR CORPORATION, Gothenburg (SE)

(*) Notice: Subject to any disclaimer, the term of this patent is extended or adjusted under 35 U.S.C. 154(b) by 142 days.

(21) Appl. No.: 17/505,265

(22) Filed: Oct. 19, 2021

(65) Prior Publication Data

US 2023/0118794 A1 Apr. 20, 2023

(51) Int. Cl.
| | | |
|---|---|---|
| H02M 3/00 | (2006.01) | |
| B60L 53/12 | (2019.01) | |
| B60L 53/14 | (2019.01) | |
| B60L 53/22 | (2019.01) | |
| B60L 53/53 | (2019.01) | |
| B60L 53/55 | (2019.01) | |
| B60L 53/62 | (2019.01) | |
| H02M 1/42 | (2007.01) | |

(52) U.S. Cl.
CPC ............ *H02M 3/015* (2021.05); *B60L 53/12* (2019.02); *B60L 53/14* (2019.02); *B60L 53/53* (2019.02); *B60L 53/55* (2019.02); *B60L 53/62* (2019.02); *H02M 1/4208* (2013.01); *H02M 1/4258* (2013.01)

(58) Field of Classification Search
CPC .. H02M 3/015; H02M 1/4208; H02M 1/4258; H02M 3/33584; H02M 3/01; B60L 53/14; B60L 53/62; B60L 53/22; B60L 55/00; H02J 2310/48; H02J 50/10; H02J 2207/20; H02J 2207/40; Y02T 10/7072
See application file for complete search history.

(56) References Cited

U.S. PATENT DOCUMENTS 5,771,165 A * 6/1998 Couture .............. H02M 1/4208
323/338
8,482,158 B2 * 7/2013 Kurs ....................... H01F 38/14
307/104

(Continued)

FOREIGN PATENT DOCUMENTS

CN 104333103 A 2/2015
DE 102018100271 A1 * 7/2018 ............ B60L 11/182

*Primary Examiner* — Nghia M Doan
(74) *Attorney, Agent, or Firm* — Raj S. Dave; Dave Law Group LLC (57) ABSTRACT

Embodiments relate to a system comprising: a first module. The first module comprises a power receiving module configured to receive an input power from an energy source. The system further comprises a second module. The second module comprises a power conversion module configured to convert the input power to an output power. The system further comprises a third module. The third module comprises a control module for configuring the first module or the second module to perform a charging operation or a discharging operation. The first module, the second module and the third module are functionally integrated in the system to perform multiple modes of the charging operation or the discharging operation. The third module controls an impedance of the input power and the output power in the second module.

20 Claims, 7 Drawing Sheets

(56) References Cited

U.S. PATENT DOCUMENTS

| | | | |
|---|---|---|---|
| 8,692,412 B2* | 4/2014 | Fiorello | H03H 7/40 |
| | | | 307/104 |
| 8,810,205 B2 | 8/2014 | Ichikawa | |
| 8,933,661 B2 | 1/2015 | Nergaard | |
| 8,970,060 B2 | 3/2015 | Ichikawa | |
| 9,035,499 B2* | 5/2015 | Kesler | B60L 53/63 |
| | | | 307/104 |
| 9,253,933 B2 | 2/2016 | Lim et al. | |
| 9,287,719 B2 | 3/2016 | Katsunaga et al. | |
| 9,941,708 B2* | 4/2018 | Keeling | B60L 53/30 |
| 10,340,742 B2 | 7/2019 | Kim et al. | |
| 10,411,515 B2 | 9/2019 | Lee et al. | |
| 10,427,532 B2 | 10/2019 | Elshaer et al. | |
| 10,493,853 B2* | 12/2019 | Widmer | B60L 53/126 |
| 10,686,330 B2* | 6/2020 | Shevde | H02J 50/00 |
| 11,031,818 B2* | 6/2021 | Danilovic | H02H 3/44 |
| 11,400,821 B2* | 8/2022 | Galin | H02J 7/0042 |
| 2010/0181845 A1* | 7/2010 | Fiorello | H01F 27/42 |
| | | | 307/104 |
| 2013/0113298 A1 | 5/2013 | Ryu et al. | |
| 2015/0028800 A1* | 1/2015 | Kim | H02J 7/0068 |
| | | | 320/108 |
| 2019/0006885 A1* | 1/2019 | Danilovic | H02H 3/38 |
| 2020/0247250 A1* | 8/2020 | Gonzales Espin | B60L 53/22 |
| 2020/0298722 A1 | 9/2020 | Smolenaers | |
| 2021/0094426 A1 | 4/2021 | Elshaer et al. | |
| 2021/0159733 A1 | 5/2021 | Czimmek et al. | |

\* cited by examiner

INTEGRATED POWER CONVERSION TOPOLOGY FOR ELECTRIC VEHICLES

FIELD OF THE INVENTION

This invention relates to an integrated power conversion topology. The invention is more particularly concerned with an integrated power conversion topology to perform multiple modes of a charging operation or a discharging operation.

BACKGROUND

An electric vehicle (EV) is a vehicle that uses one or more electric motors for propulsion. It can be powered by a collector system, with electricity from extravehicular sources, or it can be powered autonomously by a battery, or it can be powered autonomously by an electric charge storage. The electric vehicles (EV) that are powered by the battery or an electric charge storage are plug-in electric vehicles (PEV) that require charging from an external energy source of electricity. The external energy source may be a power grid, wireless source, or an electric charge storage.

Systems and methods exist for charging plug-in electric vehicles. Separate systems exist to charge the electric vehicle from the power grid, wireless source, or an electric charge storage. Current systems for charging and discharging are standalone systems with the drawback of separate architectures embedded in the vehicle. Also, there are drawbacks such as bigger packaging volume, increased weight, and increased cost.

Therefore, there is a need for an integrated system with a power conversion topology to perform multiple modes of a charging operation or a discharging operation.

SUMMARY

An embodiment relates to a system comprising: a first module, wherein the first module comprises a power receiving module configured to receive an input power from an energy source; a second module, wherein the second module comprises a power conversion module configured to convert the input power to an output power; a third module, wherein the third module comprises a control module for configuring the first module and the second module to perform a charging operation and a discharging operation. The first module, the second module and the third module are functionally integrated to perform multiple modes of the charging operation and the discharging operation. The third module controls an impedance during the charging operation and the discharging operation.

In an embodiment, the power receiving module comprises a wired connection.

In an embodiment, the power receiving module comprises a wireless connection.

In an embodiment, the input power comprises an electrical power.

In an embodiment, the energy source comprises a power grid, a wireless source, and an electric charge storage.

In an embodiment, the power receiving module receives the input power from the energy source one at a time.

In an embodiment, the power grid comprises an alternating current power grid, a high voltage alternating current power grid, and a high voltage direct current power grid.

In an embodiment, the wireless source comprises a magnetic field, an inductive field, a radio frequency source.

In an embodiment, the electric charge storage comprises a battery.

In an embodiment, the electric charge storage comprises a storage capacitor.

In an embodiment, the charging operation comprises charging from the power grid, charging from the wireless source, and charging from the electric charge storage.

In an embodiment, the discharging operation comprises discharging of the electric charge storage to a direct current voltage load and discharging of the electric charge storage to an alternating current voltage load.

In an embodiment, the output power to the direct current voltage load is during charging from the power grid, charging through the wireless source, discharging of the electric charge storage to the direct current voltage load and discharging of the electric charge storage to the alternating current voltage load.

In an embodiment, the direct current voltage load comprises direct current components of an electric vehicle.

In an embodiment, the power conversion module comprises a circuit.

In an embodiment, the circuit comprises: a power factor correction unit; a converter; a switch; a transformer; an impedance matching network; a voltage regulator. The control module configures the circuit by switching the switch and the converter to perform the charging operation and the discharging operation.

In an embodiment, the converter is configured to perform as a rectifier, an inverter, and a direct current-to-direct current converter.

In an embodiment, the converter comprises a resonant converter.

In an embodiment, the converter comprises a full bridge resonant converter and a half bridge resonant converter with variable switching.

In an embodiment, the transformer comprises a high frequency transformer with galvanic isolation; and wherein the transformer comprises a plurality of windings coupled together.

In an embodiment, the control module is configured to control the impedance of the input power and the output power through the impedance matching network.

In an embodiment, the output power comprises a direct current voltage.

In an embodiment, the output power comprises an alternating current voltage.

In an embodiment, the direct current voltage comprises a low voltage direct current up to 56 Volts.

In an embodiment, the direct current voltage comprises a high voltage direct current up to 800 Volts.

In an embodiment, the direct current voltage comprises a medium direct current voltage up to 250 Volts.

In an embodiment, the control module comprises a processor, a controller, and a control logic.

In an embodiment, the processor comprises a microprocessor, a digital signal processor, an embedded processor, an application-specific system processor, an application-specific instruction set processor, and an application specific integrated circuit.

In an embodiment, the controller comprises a microcontroller.

In an embodiment, the controller comprises a programmable logic controller.

In an embodiment, the control logic comprises a relay logic control.

In an embodiment, the multiple modes of the charging operation and the discharging operation are operable one at a time.

Another embodiment relates to an apparatus comprising a power conversion module comprising a circuit comprising a control module for configuring a first module and a second module to perform a charging operation and a discharging operation; a power factor correction unit; a converter; a switch; a transformer; an impedance matching network; and a voltage regulator;

wherein the power conversion module is configured to convert an input power to an output power. The control module controls the circuit by switching the switch and the converter to perform the charging operation and the discharging operation.

In an embodiment, the converter is configured to perform as a rectifier, an inverter, and a direct current-to-direct current converter.

In an embodiment, the converter comprises a resonant converter.

In an embodiment, the converter comprises a full bridge resonant converter and a half bridge resonant converter with variable switching.

In an embodiment, the transformer comprises a high frequency transformer with galvanic isolation; and wherein the transformer comprises a plurality of windings coupled together.

In an embodiment, the control module is configured to control an impedance of the input power and the output power through the impedance matching network.

In an embodiment, the control module controls an impedance in the second module to operate the converter in the circuit at a resonant frequency.

In an embodiment, the control module controls the impedance in the second module such that maximum input power is received by the first module in case of a wireless connection.

Another embodiment relates to a method comprising: receiving an input power from an energy source using a first module, wherein the first module comprises a power receiving module configured to receive the input power from the energy source; converting the input power to an output power using a second module, wherein the second module comprises a power conversion module configured to convert the input power to the output power; performing a charging operation and a discharging operation using a third module, wherein the third module comprises a control module for configuring the first module and the second module to perform the charging operation and the discharging operation. The first module, the second module and the third module are functionally integrated to perform multiple modes of the charging operation and the discharging operation; and wherein the third module controls an impedance during the charging operation and the discharging operation.

In an embodiment, converting the input power to the output power comprises configuring a circuit of the second module using the control module, by switching a switch and a converter to perform the charging operation and the discharging operation.

In an embodiment, the third module controls the impedance of the input power and the output power using the control module through an impedance matching network of the circuit.

In an embodiment, the charging operation comprises charging from a power grid, charging from a wireless source, and charging from an electric charge storage.

In an embodiment, the discharging operation comprises discharging of the electric charge storage to a direct current voltage load and discharging of the electric charge storage to an alternating current voltage load.

In an embodiment, the output power to the direct current voltage load is during charging from the power grid, charging through the wireless source, discharging of the electric charge storage to the direct current voltage load and discharging of the electric charge storage to the alternating current voltage load.

In an embodiment, the multiple modes of the charging operation and the discharging operation are operable one at a time.

Another embodiment relates to a method to charge an electric vehicle through an integrated power conversion topology through an power grid comprising turning on a first switch; turning off a second switch; receiving electric power from the power grid through a receiving terminal; correcting power factor through a power factor correction unit; converting the power grid into high voltage DC through a high frequency AC to DC converter; converting DC voltage into high voltage DC through a DC-to-DC converter; tuning an impedance matching network to operate the DC-to-DC converter close to a resonant frequency point; and charging a battery through the high voltage DC.

In an embodiment, the tuning of the impedance matching network minimizes variation in switching frequency of the DC-to-DC converter.

In an embodiment, the method comprises: generating low voltage DC from the AC grid power through the DC-to-DC converter and a third winding of the high frequency transformer.

In an embodiment, the method comprises: regulating a voltage received through the third winding by a second converter; and suppling fixed low voltage DC through a step-down regulator.

In an embodiment, the method comprises: regulating an output current of the battery through a charging current request.

In an embodiment, the turning off of the second switch is for avoiding a stray magnetic field during charging through the AC grid power.

Another embodiment relates to a method to charge an electric vehicle through an integrated power conversion topology through wireless charging vehicle assembly, the method comprising, turning off a first switch; turning on a second switch; receiving electric power in form of high frequency AC magnetic field from a ground assembly through a wireless charging vehicle assembly; converting the high frequency AC magnetic field into AC voltage; converting the AC voltage into high voltage DC through a first converter; tuning an impedance matching network through the controller to match a source impedance of the ground assembly with a load impedance of the wireless charging vehicle assembly to convert the AC voltage into high voltage DC; and charging a battery through the high voltage DC.

In an embodiment, receiving electric power is through a magnetic receiver coil wirelessly coupled to a magnetic transmitter coil of the ground assembly.

In an embodiment, the method comprises communicating with the ground assembly through a wireless communication protocol.

In an embodiment, the method comprises regulating an output current in the battery according to a charging current request received by the ground assembly through a controller.

In an embodiment, the method comprises, generating low voltage DC by the wireless charging vehicle assembly through the high frequency transformer and the second converter.

In an embodiment, tuning of the impedance matching network is according to a variable magnetic coupling factor in order to transmit maximum power.

In an embodiment, turning off the first switch is for avoiding charging of capacitors in a power factor correction unit during charging of the battery through the wireless charging vehicle assembly.

Another embodiment relates to a method to supply low voltage DC to an electric vehicle through an integrated power conversion topology while driving the electric vehicle, the method comprising, turning off a first switch; turning off a second switch; receiving high voltage DC power from a battery; converting the high voltage DC power into low voltage DC through a first converter and a second converter; and supplying low voltage DC to low voltage load of the electric vehicle through a step down regulator.

In an embodiment, the method comprises operating the first converter and the second converter as a resonant converter at a fixed frequency close to a resonant frequency point.

In an embodiment, the method comprises, tuning an impedance matching network through the controller in case of a change in load and a battery voltage.

Another embodiment relates to a method to discharge AC power from electric vehicle through an integrated power conversion topology while the electric vehicle is in idle state, the method comprising, turning on a first switch; turning off a second switch; receiving high voltage DC power from a battery; converting the high voltage DC power into high voltage AC power through a first converter and a DC-to-DC converter; and supplying AC power to AC load through a power factor correction unit.

In an embodiment, the method comprises tuning an impedance matching network continuously to operate the DC-to-DC converter close to a resonant frequency point throughout a voltage range of the battery.

DETAILED DESCRIPTION

Definitions and General Techniques

For simplicity and clarity of illustration, the drawing figures illustrate the general manner of construction, and descriptions and details of well-known features and techniques may be omitted to avoid unnecessarily obscuring the present disclosure. The dimensions of some of the elements in the figures may be exaggerated relative to other elements to help improve understanding of embodiments of the present disclosure. The same reference numeral in different figures denotes the same element.

The articles "a" and "an" are used herein to refer to one or to more than one (i.e., to at least one) of the grammatical object of the article. By way of example, "an element" means one element or more than one element.

The terms "first," "second," "third," and the like in the description and in the claims, if any, are used for distinguishing between similar elements and not necessarily for describing a particular sequence or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

No element, act, or instruction used herein should be construed as critical or essential unless explicitly described as such. Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The terms "couple," "coupled," "couples," "coupling," and the like should be broadly understood and referred to as connecting two or more elements mechanically, electrically, and/or otherwise. Two or more electrical elements may be electrically coupled together, but not be mechanically or otherwise coupled together. Coupling may be for any length of time, e.g., permanent, or semi-permanent or only for an instant. "Electrical coupling" includes electrical coupling of all types. The absence of the word "removably," "removable," and the like near the word "coupled," and the like does not mean that the coupling, etc. in question is or is not removable.

As defined herein, two or more elements or modules are "integral" or "integrated" if they operate functionally together.

Unless otherwise defined herein, scientific and technical terms used in connection with the present invention shall have the meanings that are commonly understood by those with ordinary skill in the art. Further, unless otherwise required by context, singular terms shall include pluralities and plural terms shall include the singular. Generally, nomenclatures used in connection with the invention described herein are those well-known and commonly used in the art.

The methods and techniques of the present invention are generally performed according to conventional methods well known in the art and as described in various general and more specific references that are cited and discussed throughout the present specification unless otherwise indicated. The nomenclatures used in connection with, and the procedures and techniques of embodiments herein, and other related fields described herein are those well-known and commonly used in the art.

The following terms and phrases, unless otherwise indicated, shall be understood to have the following meanings.

The term "electric vehicle (EV)" as used herein refers to an automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be two or more wheeled vehicles manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

The term "plug-in electric vehicle (PEV)" as used herein refers to an Electric Vehicle that recharges the on-vehicle primary battery by connecting to the power grid.

The term "plug-in vehicle (PV)" as used herein refers to an electric vehicle rechargeable through wireless charging from an electric vehicle supply equipment (EVSE) without using a physical plug or a physical socket.

The term "heavy duty vehicle (HD Vehicle)" as used herein refers to any four- or more wheeled vehicle as defined in 49 CFR 523.6 or 49 CFR 37.3 (bus).

The term "light duty plug-in electric vehicle" as used herein refers to a three or four-wheeled vehicle propelled by an electric motor drawing current from a rechargeable storage battery or other energy devices for use primarily on public streets, roads and highways and rated at less than 4,545 kg gross vehicle weight.

The term "power receiving module" as used herein refers to a module configured to receive electrical or mechanical power from a power source.

The term "input power" as used herein refers to the amount of energy put into a device. The mean value of the instantaneous power into the input terminals the power herein refers to electric power.

The term "energy source" as used herein refers to the electrical and mechanical equipment and their interconnections necessary to generate or convert power.

The term "AC" as used herein refers to alternating current.

The term "DC" as used herein refers to direct current.

The term "power conversion module" as used herein refers to convert power from direct current to alternating current for direct current power transmission, or to convert alternating current to direct current, or to convert power from one frequency into another, or to serve as a commutator for operating an AC motor at variable speed, or for transforming high-voltage DC into low-voltage DC.

The term "output power" as used herein refers to the power delivered by a system or transducer to its load.

The term "control module" as used herein refers to those parts of a digital computer that regulate the carrying out of instructions in proper sequence, the interpretation of each instruction, and the application of the proper signals to the arithmetic unit and other parts in accordance with this interpretation.

The term "multiple modes of the charging operation" as used herein refers to different modes of restoring and maintaining an electric charge in an electric charge storage.

The term "impedance" as used herein refers to is an expression of the opposition that an electronic component, circuit, or system offers to alternating or direct electric current. Its inverse is called the admittance.

The term "wired connection" as used herein refers to a connection using physical cables to connect between the devices.

The term "wireless connection" as used herein refers to electrical connection between two or more points that do not use an electrical conductor as a medium.

The term "power grid" as used herein refers to a network, usually of a power company, for transmitting and distributing electric power.

The term "wireless source" as used herein refers to a wireless electrical energy source to transfer electrical power without wires and is based on technologies using time-varying electric, magnetic, or electromagnetic fields.

The term "electric charge storage" as used herein refers to a device that stores electric charge in the form of charge, chemical energy, or magnetic energy.

The term "circuit" as used herein refers to an arrangement of interconnected components that has at least one input and one output terminal, and whose purpose is to produce at the output terminals a signal that is a function of the signal at the input terminals.

The term "component" as used herein refers to a part or element of a larger whole, especially a part of a machine, a circuit, or a vehicle.

The term "controls an impedance" as used herein refers to the process of adjustment of the load-circuit impedance to produce the desired energy transfer from the power source to the load.

The term "low voltage" as used herein refers to a term applied to voltage levels that are less than or equal to 56 Volts.

The term "high voltage" as used herein refers to a term applied to voltage levels that are greater than 400 Volts.

The term "medium DC voltage" as used herein refers to a term applied to voltage levels that is between 60 Volts to 350 Volts.

The term "processor" as used herein refers to a device that interprets and executes instructions, consisting of at least an instruction control unit and an arithmetic unit that contains a central processing unit.

The term "controller" as used herein refers to a functional unit in a computer system that controls one or more units of the peripheral equipment.

The term "control logic" as used herein refers to a predetermined sequence of operation of relays and other control devices.

The term "DC voltage load" or "direct current voltage load" as used herein refers to a direct current (DC) power-consuming device connected to a circuit.

The term "AC voltage load" or "alternating current voltage load" as used herein is an alternating current (AC) power-consuming device connected to a circuit.

The term "load" may also denote a resistor or impedance which replaces some circuit element temporarily or permanently. For example, if a filter is disconnected from a line, the line may be artificially terminated in an impedance which simulates the filter that was removed.

The term "resonant frequency" as used herein refers to any frequency at which resonance occurs. For a given network, resonance frequencies may differ for different quantities, and almost always differ from natural frequencies. For example, in a simple series resistance-inductance-capacitance circuit there is a resonance frequency for current, a different resonance frequency for capacitor voltage, and a natural frequency different from each of these.

The term "resonance" as used herein refers to a condition in a circuit containing inductance and capacitance in which the capacitive reactance is equal to the inductive reactance. This condition occurs at only one frequency in a circuit with fixed constants, and the circuit is said to be "tuned" to this frequency. The resonance frequency can be changed by varying the value of the capacitance or inductance of the circuit.

The term "battery management system (BMS)" used herein refers to a system that is used to monitor and control power storage systems, assure health of battery cells, and deliver power to vehicle systems. Isolation products have numerous uses inside BMS in the electrical domains of Electric Vehicles (EV) or Hybrid Electric Vehicles (HEV).

In an embodiment, a system comprises a first module, wherein the first module comprises a power receiving module configured to receive an input power from an energy source; a second module, wherein the second module comprises a power conversion module configured to convert the input power to an output power; a third module, wherein the third module comprises a control module for configuring the first module or the second module to perform a charging operation or a discharging operation; wherein the first module, the second module and the third module are functionally integrated to perform multiple modes of the charging operation or the discharging operation; and wherein the third module controls an impedance during the charging operation and the discharging operation.

Figure 1A:
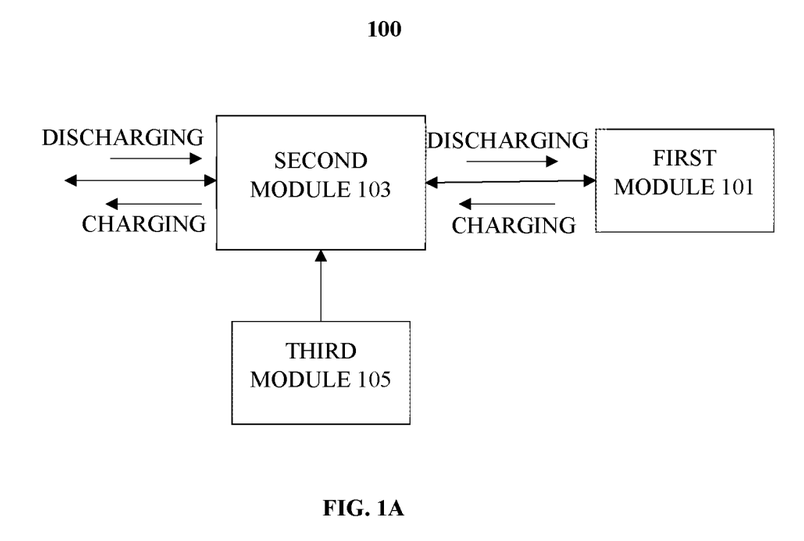
FIG. 1A-1B shows a high-level block diagram of a system to execute an integrated power conversion topology.
Figure 1B:
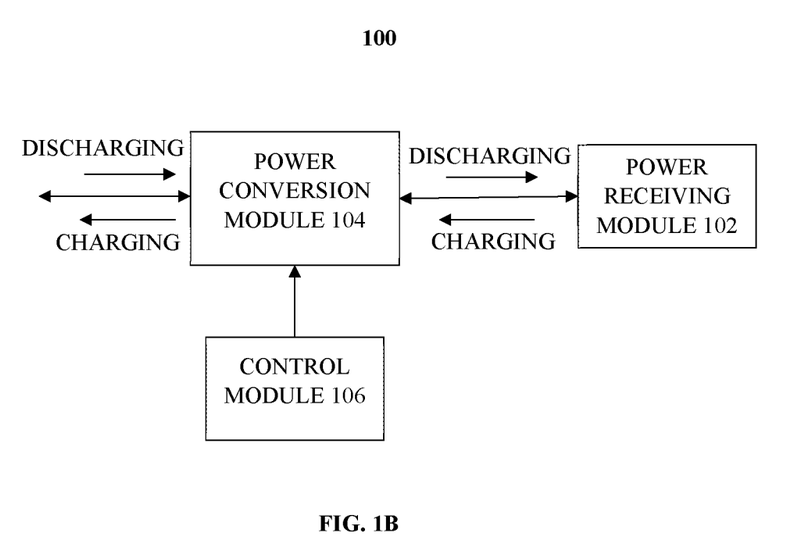

As an example, FIG. 1A-1B shows a block level diagram of a system 100 to execute an integrated power conversion topology. The system 100 comprises a first module 101. The first module 101 comprises a power receiving module 102 configured to receive an input power from an energy source. The power receiving module 102 is coupled with a second module 103. The second module 103 comprises a power conversion module 104 configured to convert the input power to an output power. The system 100 comprises a third module 105. The third module 105 comprises a control module 106 for configuring the first module 101 or the second module 103 to perform a charging operation or a discharging operation. Further, the first module 101, the second module 103 and the third module 105 are functionally integrated to perform multiple modes of the charging operation or the discharging operation.

In an embodiment, the power receiving module comprises a wired connection or a wireless connection, wherein the wired connection comprises a physical connection and wherein the wireless connection comprises a transmitter and a receiver.

In an embodiment, the input power comprises an electrical power.

In an embodiment, the energy source comprises one or more of a power grid, a wireless source, and an electric charge storage.

In an embodiment, the power receiving module receives input power from the energy source one at a time.

Figure 2:
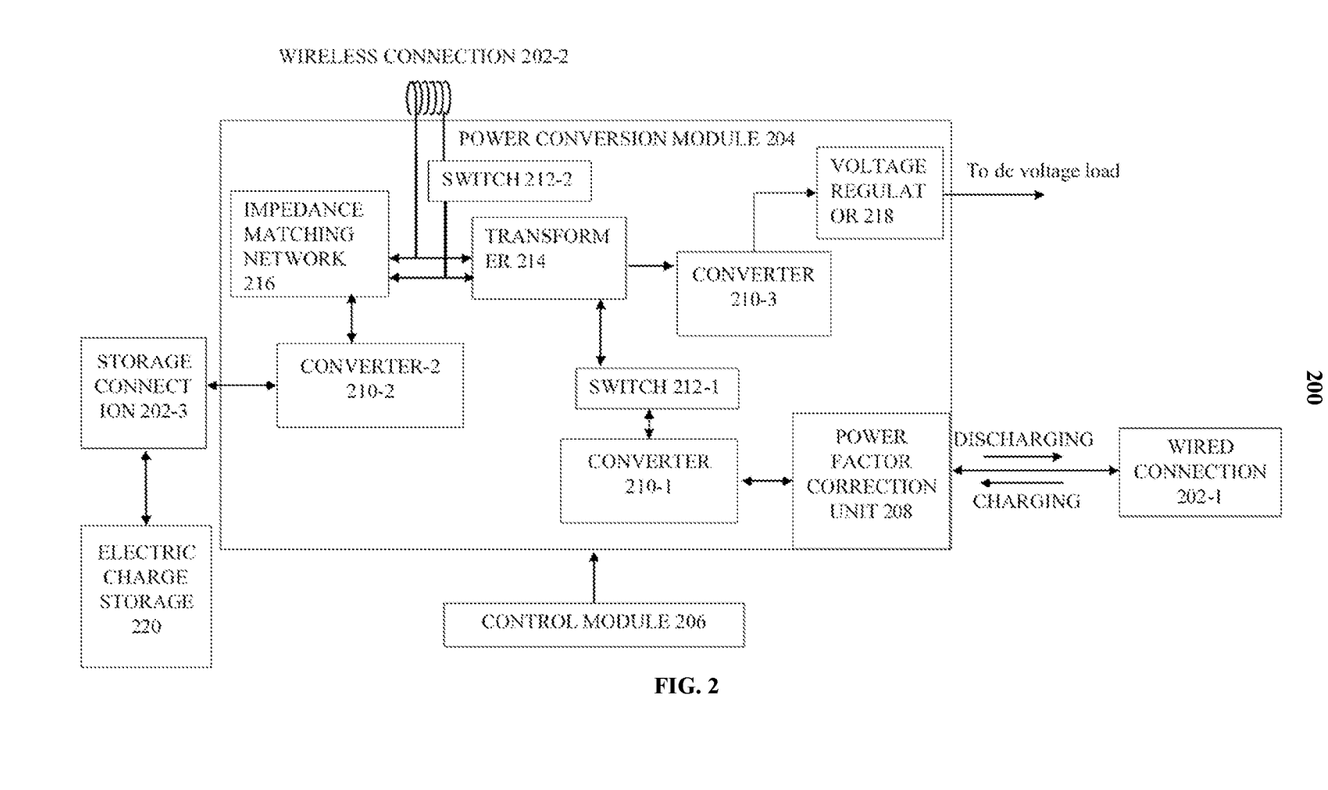
FIG. 2 shows a detailed block diagram of the system to execute an integrated power conversion topology.

As an example, FIG. 2 shows a detailed block diagram of the system 200 to execute an integrated power conversion topology. The power receiving module may comprise a wired connection 202-1, a wireless connection 202-2, and a storage connection 202-3. The wired connection 202-1 may comprise a physical connection. The wireless connection 202-2 may comprise a transmitter and a receiver. The storage connection 202-3 may comprise a physical connection. The input power received by the power receiving module may comprise an electrical power. The electric power may be received from an energy source that may comprise one or more of power grids, a wireless source, and an electric charge storage 220. The electric power from the power grid and an electric charge storage 220 is through the wired connection 202-1. The electric power received from the wireless source is through the wireless connection 202-2. The wireless source comprises a transmitter to transmit the power. The transmitter of the wireless source is wirelessly coupled with the receiver of the wireless connection of the power receiving module 202. The wirelessly coupled transmitter of the wireless source and the receiver of the wireless connection comprise a variable magnetic coupling factor. The variable magnetic coupling factor depends on an alignment and distance between the transmitter of the wireless source and the receiver of the wireless connection. The power receiving module may receive input power from the energy source one at a time, whereby the power receiving module 202 receives input power from the wired connection, the wireless connection, and the storage connection with autonomous switching by the control module 206.

In an embodiment, the power grid comprises an AC power grid, a high voltage AC (HVAC) power grid, and high voltage DC (HVDC) power grid.

In an embodiment, the wireless source comprises a magnetic field, an inductive field, or a radio frequency source.

In an embodiment, the electric charge storage comprises one of a battery, storage capacitors or inductors. The electric charge storage may be inside the electric vehicle.

In an embodiment, the power conversion module comprises a circuit.

In an embodiment, the circuit comprises a power factor correction unit; one or more converters; one or more switches; a transformer; an impedance matching network; a voltage regulator; and wherein the control module configures the circuit by switching the one or more switches and the one or more converters to perform the charging operation or the discharging operation.

In an embodiment, the one or more converters are configured to perform as a rectifier, an inverter, and a DC-to-DC converter.

In an embodiment, the second module 204, which is a power conversion module may comprise a circuit for conversion of the input power received through the power receiving module. The circuit comprises a power factor correction unit 208; one or more converters 210; one or more switches 212; a transformer 214; an impedance matching network 216; and a voltage regulator 218. The one or more converters may be connected in series or parallel for the conversion of input power such as converter 210-1, converter 210-2, converter 210-3 to converter 210-$n$, where n is any number between 1 to n. The converters comprise a bridge of switches configured to perform as a rectifier, an inverter, and a DC-to-DC converter. The switches comprise transistors, Bipolar Junction Transistors (BJTs), Field Effect Transistors (FETs), Metal Oxide Semiconductor Field Effect Transistors (MOSFETs) and other fast switching semiconductor switches. The switches may not comprise a diode, however a diode is connected parallel to each switch in the bridge of the one or more converters 210.

In an embodiment, the one or more converters 210 comprise a resonant converter.

In an embodiment, the one or more converters 210 comprise a full bridge resonant converter or a half bridge resonant converter with variable switching. The one or more converters 210 is operated at a fixed frequency close to the resonant frequency point in order to keep the power losses to a minimum.

In an embodiment, the transformer comprises a high frequency transformer with galvanic isolation; and wherein the transformer comprises two or more windings coupled together.

The wired connection 202-1 through a power grid is connected to the power factor correction unit 208. The output of the power factor correction unit 208 is connected to one of the one or more converters 210-1. The output of the one or more converters 210-1 is coupled with a first winding of the transformer through one or more switches 212-1. The transformer 214 comprises a high frequency transformer with galvanic isolation having more than two windings which are coupled together. A secondary winding of the transformer 214 is connected to the impedance matching network 216. A turn ratio of the secondary winding is defined by the square root of a ratio of magnetizing inductance of the first winding and the secondary winding.

In an embodiment, the control module is configured to control the impedance of the input power and the output power through the impedance matching network.

The impedance matching network 216 comprises switchable capacitors and inductors. The control module 206 controls the impedance of the circuit by controlling the switching of the switchable capacitors and inductors of the impedance matching network 216. The impedance matching network 216 is coupled to one of the one or more converters 210-2 which is in turn connected to the electric charge storage 220.

In an embodiment, the receiver of the wireless connection 202-2 is connected in parallel to the secondary winding of the transformer 214 through the one or more switches 212-2. A third winding of the transformer 214 is connected to one of the one or more converters 210-3. The converter 210-3 is connected to a voltage regulator 218 to provide output power to a DC voltage load. The voltage regulator 218 comprises a step-down voltage regulator or a step-up voltage regulator. The converter 210-3 regulates a voltage received through the third winding of the high frequency transformer and supplies fixed output power through the voltage regulator.

In an embodiment, the output power comprises one or more of a DC voltage and an AC voltage, wherein the DC voltage comprises a low voltage DC up to 56 Volts, a high voltage DC up to 800 Volts, a medium DC voltage up to 250 Volts.

The circuit of the second module 204, which is a power conversion module is configured to convert the input power to an output power to perform multiple modes of charging operation and discharging operation. The output power comprises one or more of DC voltages and AC voltages. The DC voltage comprises a low voltage DC for 12 Volt DC loads up to 12 to 16 Volts and for 48 Volt DC loads from 36 to 56 Volts. The DC voltage comprises a high voltage DC from 400 to 800 Volts.

In an embodiment, the third module comprises the control module 206 for configuring the first module or the power conversion module 204 to perform a charging operation or a discharging operation.

In an embodiment, the control module comprises one or more of processors, a controller, and a control logic.

In an embodiment, the processor may comprise one or more of microprocessors, a digital signal processor, an embedded processor, an Application-Specific System Processors (ASSPs), an Application-Specific Instruction Set Processors (ASIP), and an Application Specific Integrated Circuits (ASIC). The controller may comprise a microcontroller, or a programmable logic controller (PLC). The control logic may comprise a relay logic control.

In an embodiment, the control module 206 configures the circuit by switching the one or more switches 212, the one or more converters 210 and the impedance matching network 216 to perform the charging operation or the discharging operation. The control module 206 controls the impedance of the first module or second module by controlling the switching of resistors and capacitors in the impedance matching network 216 during the charging and the discharging operation. The control module 206 configures the one or more converters 210-1, 210-2 and 210-3 to perform as a rectifier, an inverter, and a DC-to-DC converter during the multiple modes of charging operation and discharging operation.

In an embodiment, the charging operation comprises one or more of charging from the power grid, the wireless source, and the electric charge storage.

In an embodiment, the discharging operation comprises discharging of the electric charge storage to a DC voltage load and discharging of the electric charge storage to an AC voltage load through the second module.

In an embodiment, the DC voltage load comprises DC components of the electric vehicle.

In an embodiment, the AC voltage load comprises appliances such as tube lights, fan, television, refrigerator, and appliances working on AC voltage.

In an embodiment, the system is configured to perform multiple modes of charging operations or discharging operations one at a time, whereby the power receiving module receives input power from the wired connection, the wireless connection, and the storage connection with autonomous switching by the control module.

In an embodiment, the multiple modes of charging operation or discharging operation comprise four major modes: mode 1: charging of the electric charge storage through the power grid; mode 2: charging of the electric charge storage through the wireless source; mode 3: discharging of the electric charge storage to the DC voltage load and mode 4: discharging of the electric charge storage to the AC voltage load.

In an embodiment, the output power to the DC voltage load is during charging from the power grid, charging through the wireless source, discharging of the electric charge storage source to DC voltage load and discharging of the electric charge storage source to the AC voltage load.

In an embodiment, the multiple modes of the charging operation or the discharging operation are operable one at a time, whereby the power receiving module receives input power from wired connection, wireless connection, and storage connection with autonomous switching by the control module.

In an embodiment, the third module controls the impedance in the second module to operate the one or more converters in the circuit at a resonant frequency.

Figure 3:
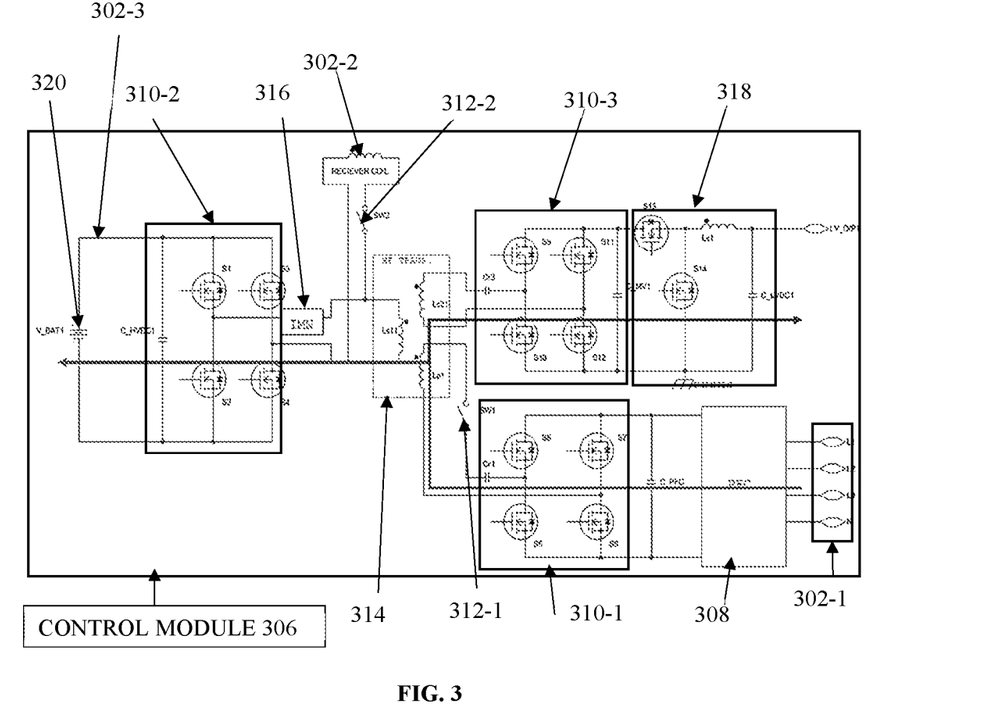
FIG. 3 shows charging of the electric charge storage through the power grid.

As an example, FIG. 3 shows mode 1: charging of the electric charge storage 320 through the power grid. The power receiving module 302-1 comprises a wired connection. The wired connection receives electric power from the power grid as AC voltage. The control module 306 switches on the one or more switches 312-1 on and one or more switches 312-2 off. The one or more switches 312-2 is turned off to avoid a stray magnetic field from the wireless connection 302-2 to interfere with the charging of the electric charge storage 320 through the power grid. The AC voltage received comprises single phase or 3-phase AC voltage. The power factor correction unit 308 corrects the power factor of the received AC voltage and converts into equivalent DC voltage. The converter 310-1 may be configured as the DC-to-DC converter to convert DC voltage received from the power factor correction unit 308 into medium DC voltage. The converter 310-2 may be configured as the DC-to-DC converter to convert the medium DC voltage into high voltage DC to charge the electric charge storage 320. The control module 306 configures the impedance matching network 316 to continuously operate the converter 310-1 and converter 310-2 close to the resonant frequency throughout a voltage range of the electric charge storage 320. The impedance matching network 316 minimizes variation in switching frequency of the converter 310-1 and converter 310-2. In this way, the efficiency of the resonant converter is improved. An output current into the electric charge storage 320 is regulated by the control module 306 through a charging current request received by a battery management system of the electric vehicle.

The electric power from the power grid is also converted to DC voltage for DC voltage loads. There is an unregulated voltage output across the third winding of the transformer 314. The converter 310-3 converts the unregulated voltage to a fixed DC voltage in order to supply DC voltage through the voltage regulator to the DC voltage loads.

Figure 4:
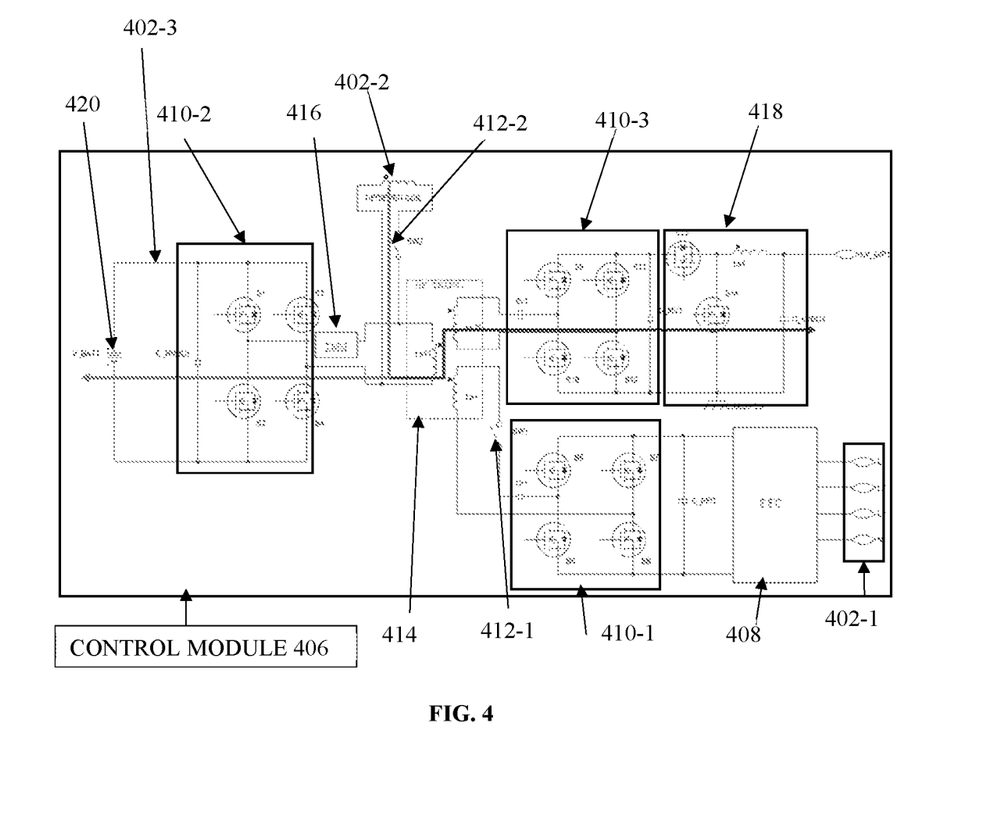
FIG. 4 shows charging of the electric charge storage through the wireless source.

As an example, FIG. 4 shows mode 2: charging of the electric charge storage 420 through the wireless source. The power receiving module 402 comprises a wireless connection 402-2. The wireless connection 402-2 receives electric power as a high frequency magnetic field through the receiver from the wireless coupled transmitter of the wireless source. The control module 406 switches off the one or more switches 412-1 and switches on the one or more switches 412-2. The one or more switches 412-2 is turned off to avoid charging of capacitors in the power factor correction unit 408. The control module 406 configures the impedance matching network 416 to match the impedance of the wireless source with the receiver of the wireless connection through the variable magnetic coupling factor. The impedance is matched in order to transfer maximum power at a fixed switching frequency of the converter 410-2. The control module 206 configures the converter 410-2 as the AC to DC converter to convert received power into high voltage DC to charge the electric charge storage 420. An output current into the electric charge storage 420 is regulated by the control module 406 through a charging current request received from the wireless source by a battery management system of the electric vehicle.

In an embodiment, the third module controls the impedance in the second module such that maximum input power is received by the first module in case of a wireless connection.

The high frequency magnetic field is also converted to DC voltage for the DC voltage loads by the transformer 414. There is an unregulated voltage output across the third winding of the transformer 414. The control module 406 configures the converter 410-3 to convert the unregulated voltage to a fixed DC voltage in order to supply DC voltage through the voltage regulator to the DC voltage loads. The control module 406 configures the impedance such that maximum input power is received by the power receiving module in case of a wireless connection.

Figure 5:
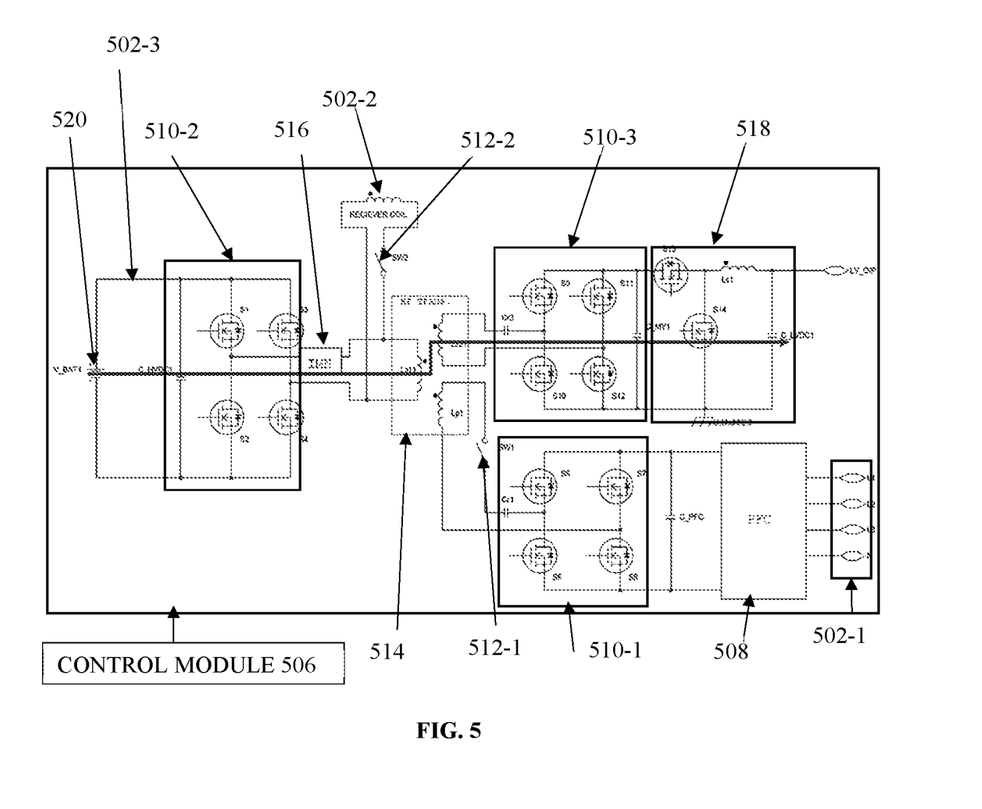
FIG. 5 shows discharging of the electric charge storage to the DC voltage load.

As an example, FIG. 5 shows mode 3: discharging of the electric charge storage 520 to the DC voltage load. The power receiving module 502-1 comprises a storage connection 502-3. The storage connection 502-3 receives electric power from the electric charge storage 520. The control module 506 switches off the one or more switches 512-1 and switches 512-2. The electric power received is high voltage DC. The control module 506 configures the converter 510-2 to convert the high voltage DC from the electric charge storage into medium DC voltage. The control module 506 configures the converter 510-3 to convert the medium DC voltage into low voltage DC in order to supply voltage to the low voltage DC loads. The control module 506 is configured to operate the converter 510-2 and the converter 510-3 as resonant converters at a fixed frequency close to a resonant frequency in order to improve the efficiency of the resonant converter. The impedance matching network 516 may be configured by the control module 506 in case of change in the DC voltage load or any change in an electric charge source voltage. The impedance matching network 516 may remain fixed when there is no change in the DC voltage load or in the electric charge source voltage.

Figure 6:
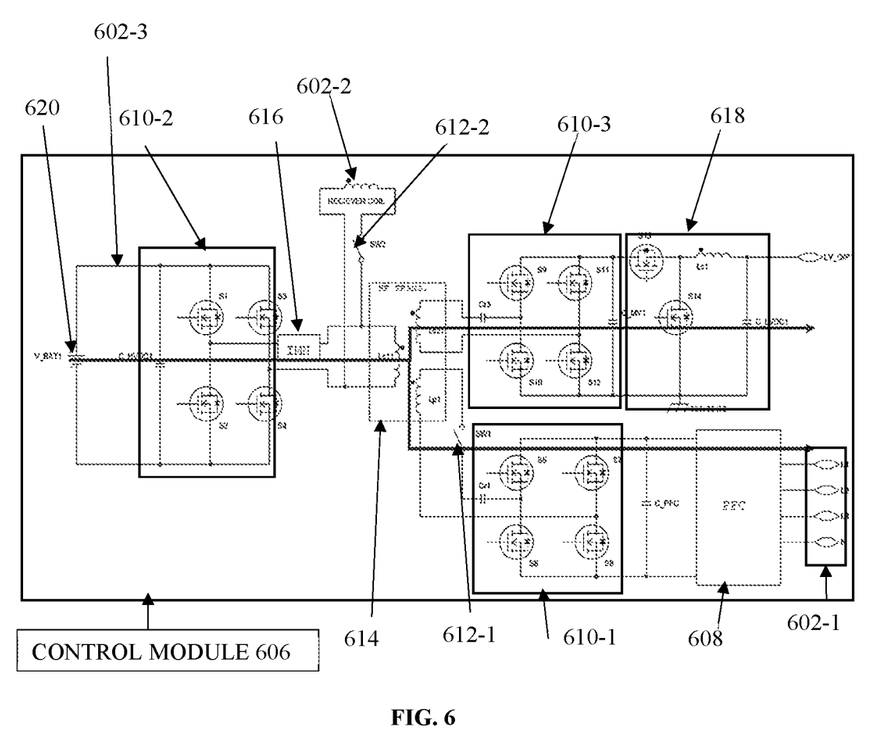
FIG. 6 shows discharging of the electric charge storage to the AC voltage load.

As an example, FIG. 6 shows mode 4: discharging of the electric charge storage 620 to the AC voltage load. The power receiving module comprises a storage connection 602-3. The storage connection 602-3 receives electric power from the electric charge storage 620. The control module 606 switches on the one or more switches 612-1 on and one or more switches 612-2 off. The one or switches 612-2 is turned off to avoid a stray magnetic field from the wireless connection 602-2 to interfere with the discharging of the electric charge storage through the power grid. The converter 610-2 is configured as a DC-to-DC converter and the converter 610-1 is configured as an inverter to convert DC to AC voltage to supply AC voltage through the power grid. The control module 606 configures the impedance matching network 616 to continuously operate the converter 610-1 and converter 610-2 close to the resonant frequency throughout a voltage range of the electric charge storage 620. The voltage range is a change in voltage of the electric charge storage 602-3 during the discharging operation. The impedance matching network 616 minimizes variation in switching frequency of the converter 610-1 and converter 610-2. In this way, the efficiency of the resonant converter is improved.

Foregoing disclosure provides illustration and description but is not intended to be exhaustive or to limit the implementations to the precise form disclosed. Modifications and variations are possible in light of the above disclosure or may be acquired from practice of the implementations.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All variations which come within the meaning and range of equivalency of the claims are to be embraced within their scope.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., Complementary Metal Oxide Semiconductor (CMOS) based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., Application Specific Integrated Circuit (ASIC) and/or Digital Signal Processor (DSP) circuit).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

What is claimed is:

1. A system comprising:
a first module, wherein the first module comprises a power receiving module configured to receive an input power from an energy source;
a second module, wherein the second module comprises a power conversion module configured to convert the input power to an output power;
a third module, wherein the third module comprises a control module for configuring the first module and the second module to perform a charging operation and a discharging operation;
wherein the first module, the second module and the third module are functionally integrated to perform multiple modes of the charging operation and the discharging operation;
wherein the third module controls an impedance during the charging operation and the discharging operation by tuning an impedance matching network by controlling switching of capacitors and inductors of the impedance matching network; and
wherein the multiple modes of the charging operation and the discharging operation comprises at least one of:
charging of an electric charge storage through a power grid;
charging of the electric charge storage through a wireless source;
discharging of the electric charge storage to a DC voltage load; and
discharging of the electric charge storage to an AC voltage load.

2. The system of claim 1, wherein the power receiving module comprises a wired connection.

3. The system of claim 1, wherein the power receiving module comprises a wireless connection.

4. The system of claim 1, wherein the input power comprises an electrical power.

5. The system of claim 1, wherein the energy source comprises the power grid, the wireless source, and the electric charge storage.

6. The system of claim 5, wherein the power receiving module receives the input power from the energy source one at a time.

7. The system of claim 5, wherein the power grid comprises an alternating current power grid, a high voltage alternating current power grid, and a high voltage direct current power grid.

8. The system of claim 5, wherein the wireless source comprises a magnetic field, an inductive field, a radio frequency source.

9. The system of claim 5, wherein the electric charge storage comprises a battery.

10. The system of claim 5, wherein the electric charge storage comprises a storage capacitor.

11. The system of claim 5, wherein the charging operation comprises charging from the power grid, charging from the wireless source, and charging from the electric charge storage.

12. The system of claim 5, wherein the discharging operation comprises discharging of the electric charge storage to a direct current voltage load and discharging of the electric charge storage to an alternating current voltage load.

13. The system of claim 12, wherein the output power to the direct current voltage load is during charging from the power grid, charging through the wireless source, discharging of the electric charge storage to the direct current voltage load and discharging of the electric charge storage to the alternating current voltage load.

14. A method comprising:
receiving an input power from an energy source using a first module, wherein the first module comprises a power receiving module configured to receive the input power from the energy source;
converting the input power to an output power using a second module, wherein the second module comprises a power conversion module configured to convert the input power to the output power; and
performing a charging operation and a discharging operation using a third module, wherein the third module comprises a control module for configuring the first module and the second module to perform the charging operation and the discharging operation;
wherein the first module, the second module and the third module are functionally integrated to perform multiple modes of the charging operation and the discharging operation; wherein the third module controls an impedance during the charging operation and the discharging operation by tuning an impedance matching network by controlling switching of capacitors and inductors of the impedance matching network; and
wherein the multiple modes of the charging operation and the discharging operation comprises at least one of:
charging of an electric charge storage through a power grid;
charging of the electric charge storage through a wireless source;
discharging of the electric charge storage to a DC voltage load; and
discharging of the electric charge storage to an AC voltage load.

15. The method of claim 14 wherein the power receiving module comprises at least one of a wireless connection and a wired connection.

16. The method of claim 14, wherein the energy source comprises a power grid, a wireless source, and an electric charge storage.

17. The method of claim 14, wherein converting the input power to the output power comprises: configuring a circuit of the second module using the control module, by switching a switch and a converter to perform the charging operation and the discharging operation.

18. The method of claim 14, wherein the charging operation comprises charging from a power grid, charging from a wireless source, and charging from an electric charge storage.

19. The method of claim 14, wherein the control module is configured to control the impedance of the input power and the output power through a impedance matching network.

20. The method of claim 14, wherein the multiple modes of the charging operation are operable one at a time.

* * * * *